March 7, 1933. W. OWEN 1,900,582
APPARATUS FOR CASE HARDENING GLASS SHEETS
Filed March 18, 1932 5 Sheets-Sheet 1
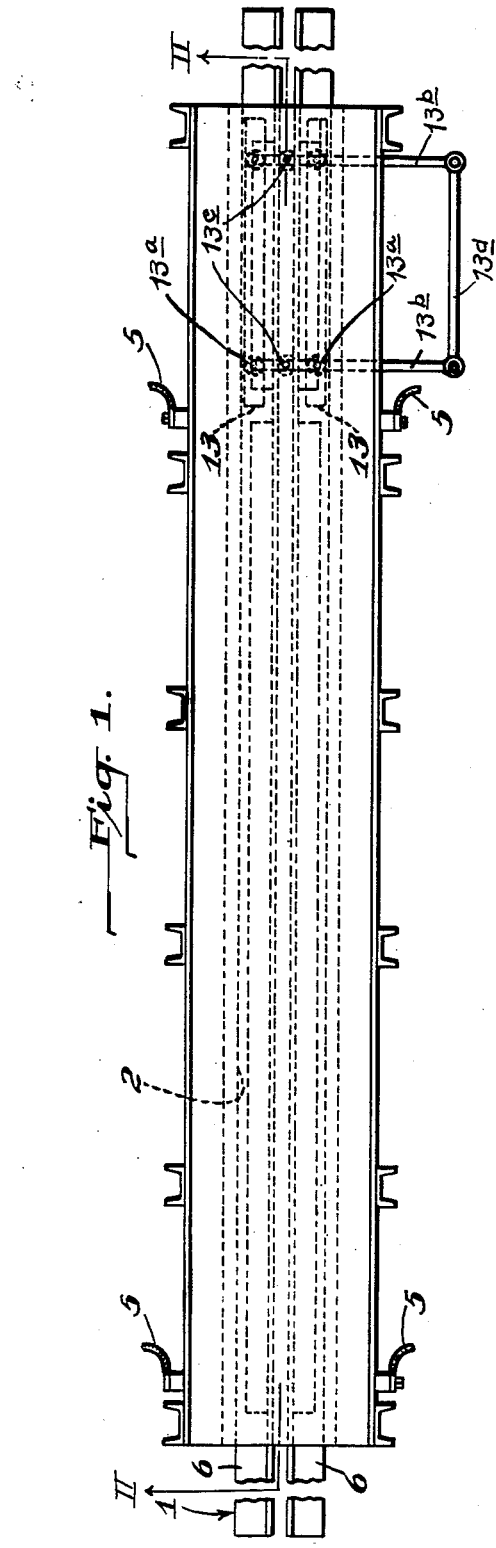
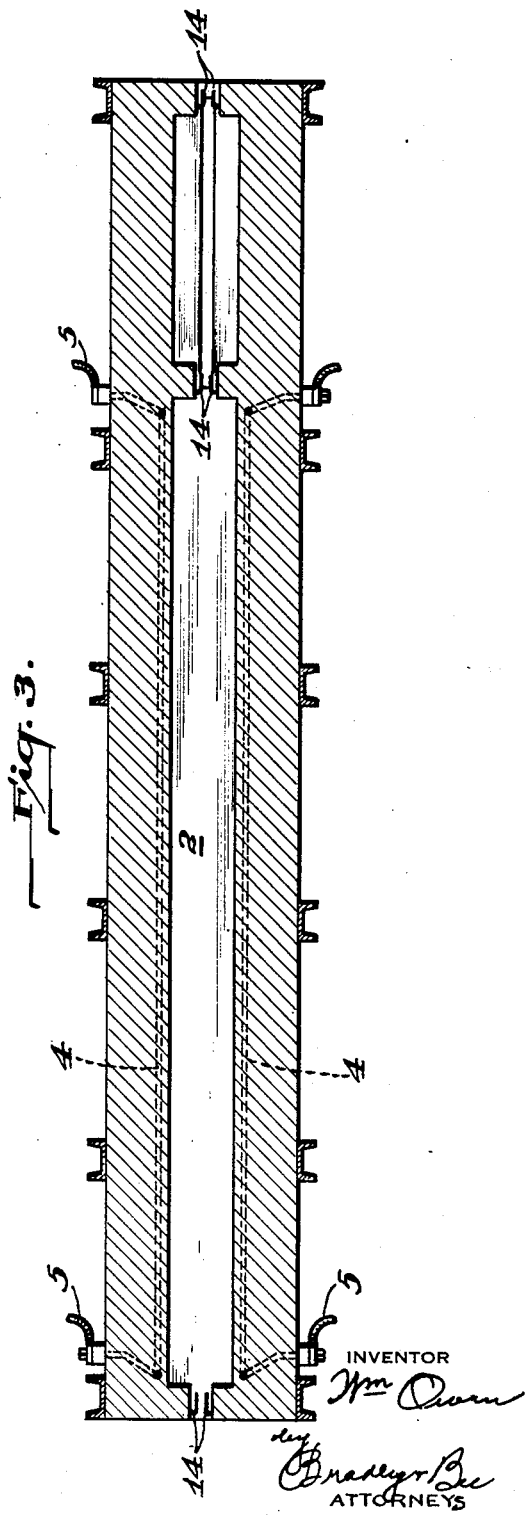
INVENTOR
Wm Owen
by Bradley Bee
ATTORNEYS

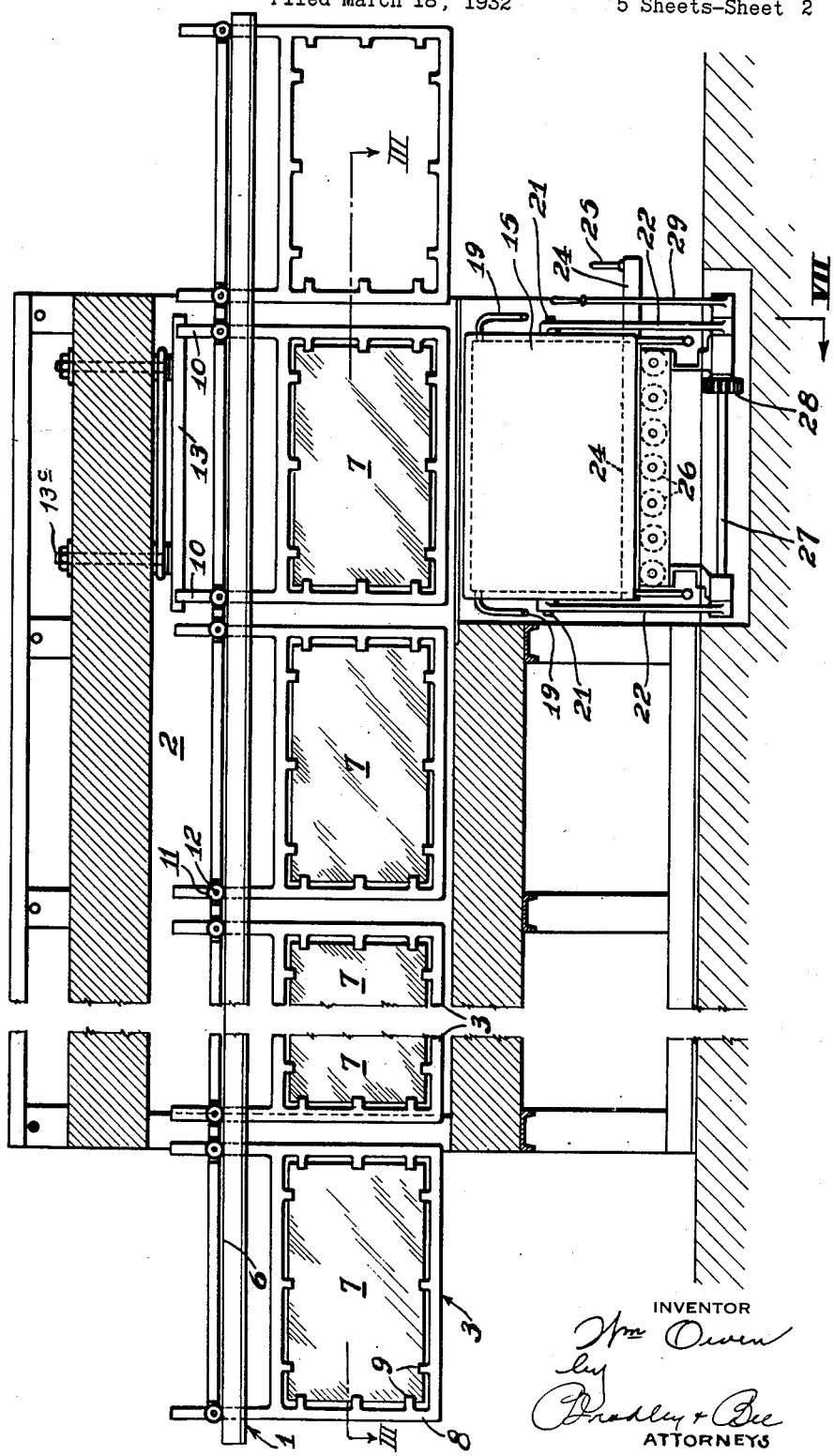

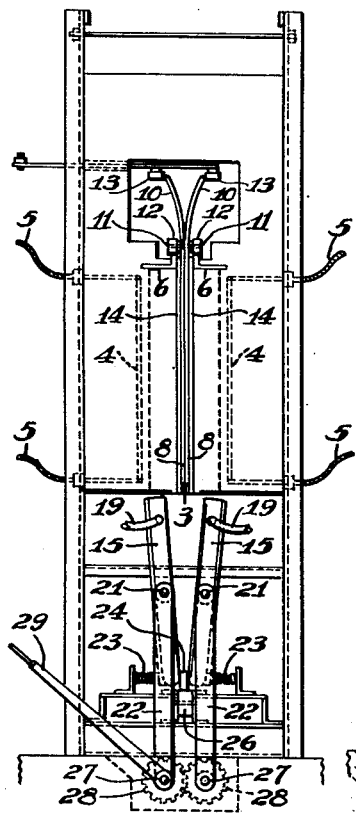
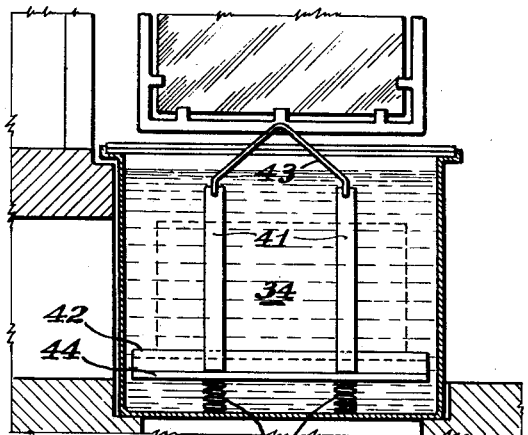
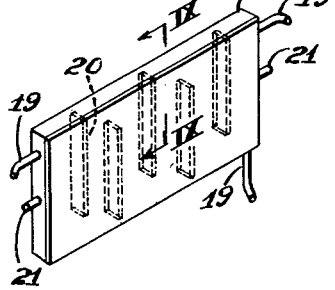
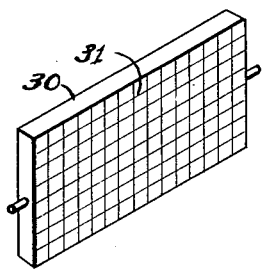
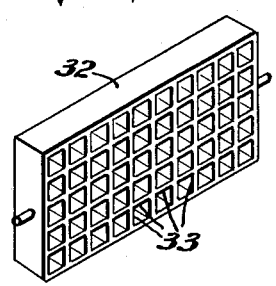
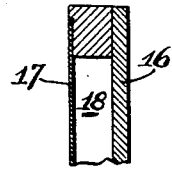
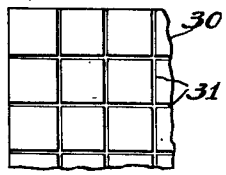
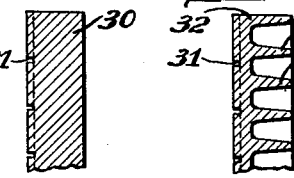

March 7, 1933.  W. OWEN  1,900,582
APPARATUS FOR CASE HARDENING GLASS SHEETS
Filed March 18, 1932   5 Sheets-Sheet 4
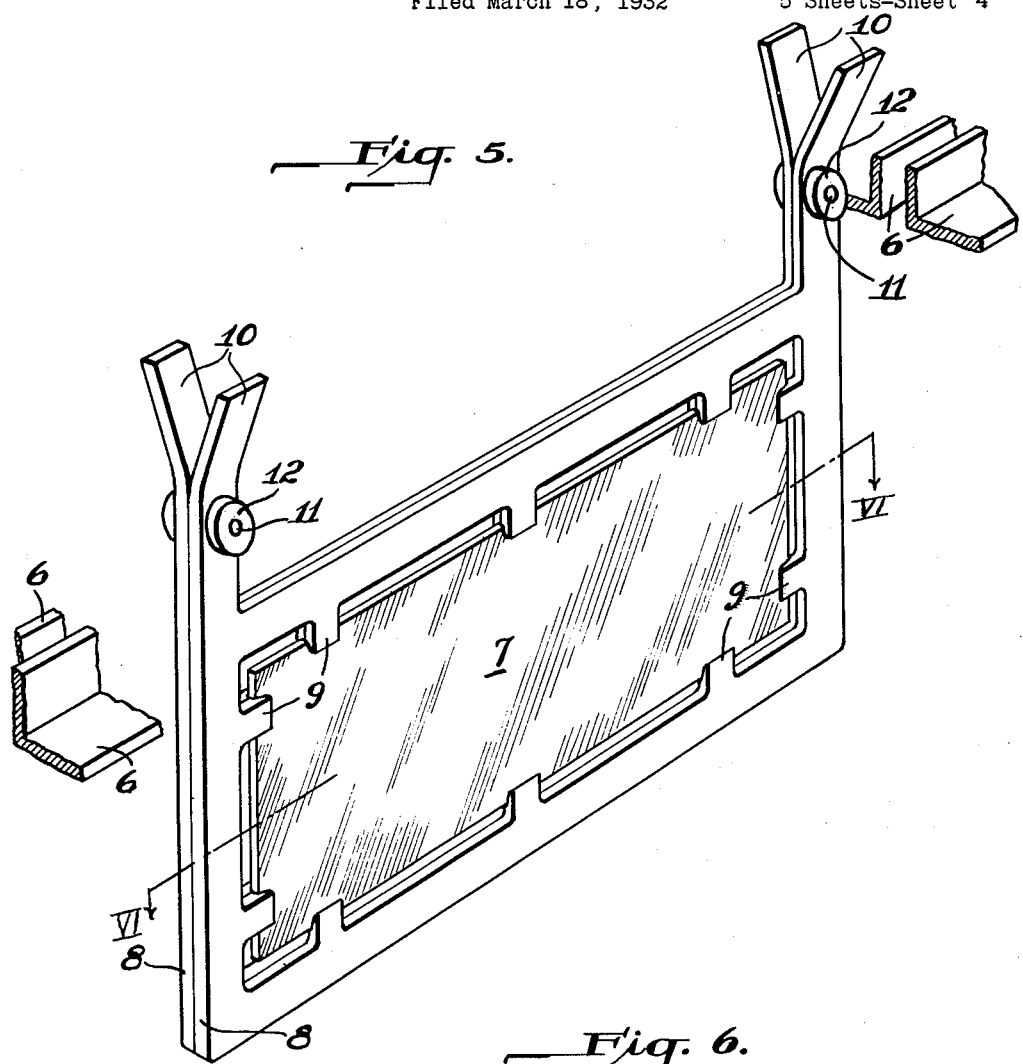
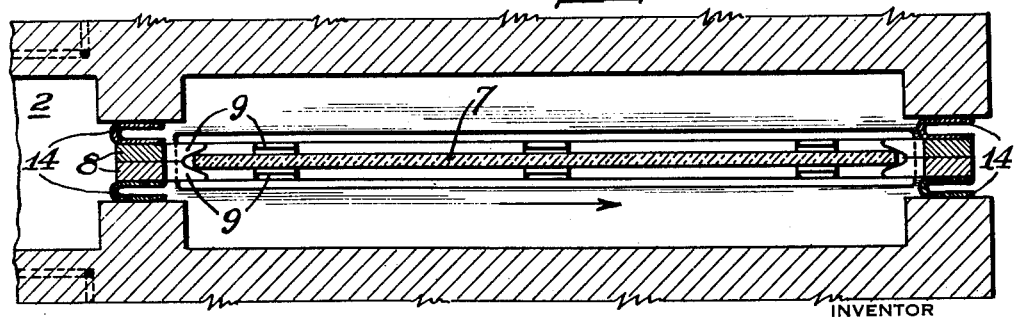

March 7, 1933.  W. OWEN  1,900,582
APPARATUS FOR CASE HARDENING GLASS SHEETS
Filed March 18, 1932   5 Sheets-Sheet 5
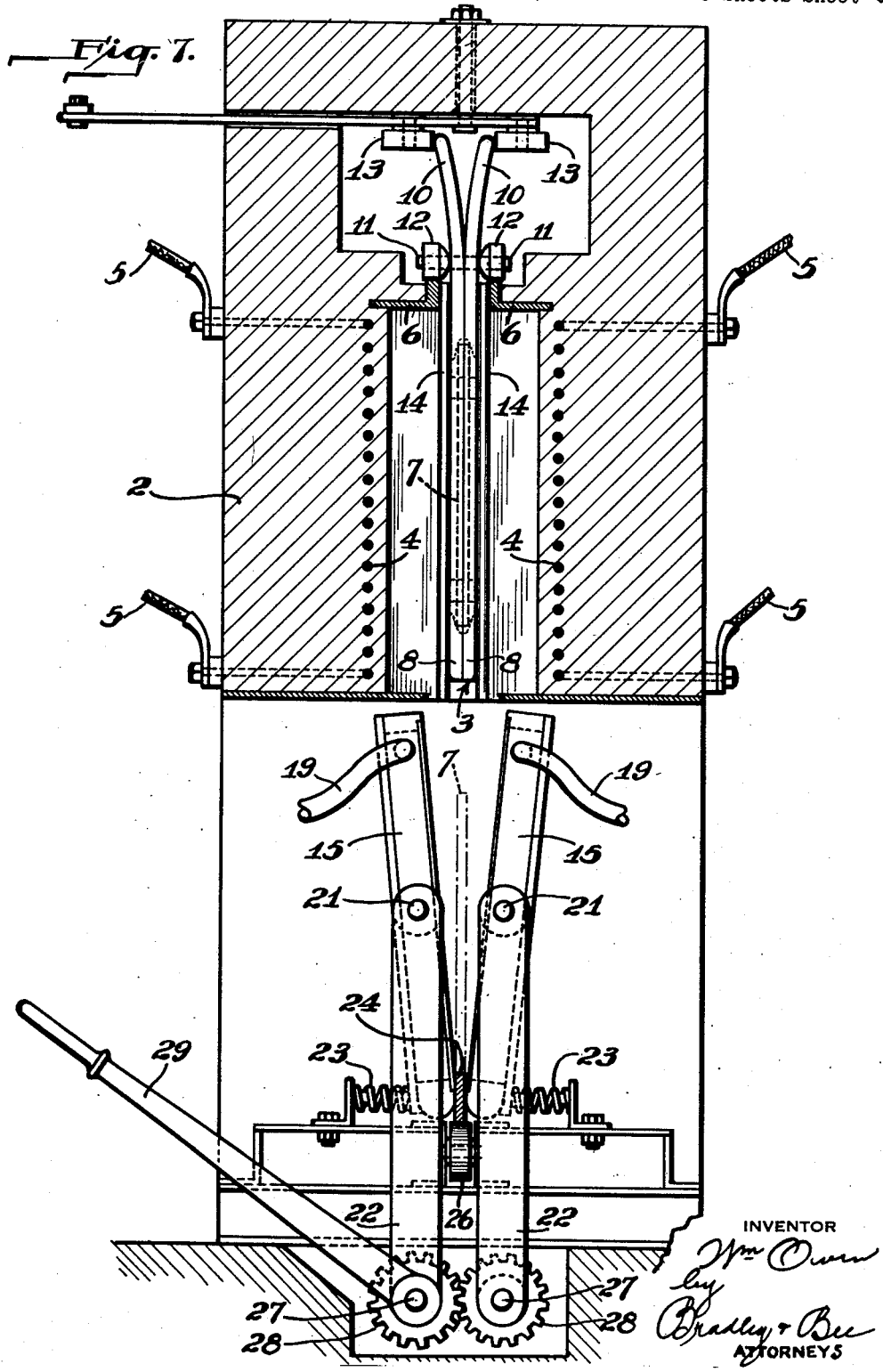
INVENTOR
Wm Owen
by
Bradley + Bee
ATTORNEYS Patented Mar. 7, 1933

1,900,582

UNITED STATES PATENT OFFICE

WILLIAM OWEN, OF PITTSBURGH, PENNSYLVANIA, ASSIGNOR TO PITTSBURGH PLATE GLASS COMPANY, A CORPORATION OF PENNSYLVANIA

APPARATUS FOR CASE HARDENING GLASS SHEETS

Application filed March 18, 1932. Serial No. 599,740.

The invention relates to apparatus for case hardening glass sheets so that their strength is greatly increased. The principal objects of the invention are the provision of an improved apparatus, which can be operated continuously with a minimum amount of labor, which avoids the necessity of grooving the glass at its upper edge to provide means for suspending it from above, which case hardens the glass without modifying its appearance, and which can be operated with little or no breakage. Certain embodiments of the invention are illustrated in the accompanying drawings, wherein:

Fig. 1 is a plan view of the apparatus. Fig. 2 is a section on the line II—II of Fig. 1. Fig. 3 is a section on the line III—III of Fig. 2. Fig. 4 is an end view of the apparatus. Fig. 5 is a perspective detail view. Fig. 6 is a section on the line VI—VI of Fig. 5. Fig. 7 is a section on the line VII—VII of Fig. 2. Figs. 8 and 9 are detail views of the platen, Fig. 8 being a perspective view and Fig. 9 being an enlarged sectional view on the line IX—IX of Fig. 8. Figs. 10, 11, and 12 are detail views showing a modification. Figs. 13 and 14 are detail views showing another modification; and Figs. 15 and 16 illustrate another modified type of apparatus, in which a liquid is used as the cooling medium.

Referring first to the construction of Figs. 1 to 9, reference numeral 1 indicates a track extending through an electrical heating furnace 2 and carrying a plurality of glass supporting frames 3, 3, 3, etc. The construction of the heating furnace will be seen by referring to Figs. 2 and 3. The device constitutes in effect a tunnel kiln which is heated by means of the electric resistance wires 4 imbedded in the refractory blocks constituting the side walls of the furnace, and heated from the leads 5, 5, 5, 5. The track on which the frames 3 are mounted consists of a pair of parallel angle irons 6, 6 (Figs. 5 and 7) supported in the upper portion of the furnace chamber. The frames 3 which carry the glass sheets 7, 7, 7, etc., are designed to support the glass sheet from beneath as well as at its other three sides, and opens downwardly to discharge the sheet into a cooling device, later described, after the sheet has been heated in its passage through the furnace and when it arrives at a position adjacent the outlet end of such furnace. Each frame comprises a rectangular member 8 having on its inner edge the series of holding members 9. When the frame is in closed position the holding members together constitute a V shape supporting member receiving the edge of the glass sheet. The end members of each frame are extended upwardly as indicated in Fig. 5, being turned laterally at the upper ends to provide opening means 10, as later described. The two frames are pivoted together upon the pins 11, 11 which also carry the rollers 12. The rollers 12 ride upon the upper edges of the angle irons 6, 6, and when the frame reaches a position over the cooling device the parts 10, 10 are acted upon by a suitable device to cause the separation of the frames so that the glass sheet 7 may drop by gravity from the frame and into the cooling device. The device for causing the frame members 8, 8 to separate are in the form of a pair of bars 13, 13, Figs. 1, 2, and 7, supported at the top of the chamber 2 in position to engage the extensions 10, 10 when the frame arrives at its proper position of discharge. These bars are pivoted at 13a (Fig. 1) on the arms 13b which are in turn pivoted on the bolts 13c. When the arms are swung laterally by the handle 13d, the bars 13 are made to approach and engage the extensions 10. In order to make the chamber tight at its ends and thus prevent a loss of heat, the sealing devices 14, 14, shown in Fig. 6, are preferably employed. These sealing members are pieces of asbestos cloth U shaped in the cross section, secured to the walls of the chamber.

Located beneath the furnace at the outlet end thereof is the device for chilling the glass sheets already referred to. This chilling means can be in various forms, several of which are illustrated. In one form of device the chilling means comprises a bath of liquid such as oil. In another form of device it consists of water cooled flexible platens adapted to engage the opposite sides of the glass sheets. Still another form of device, the cooling means are in the form of a pair of solid metal platens having their front faces criss-crossed with cuts in order to prevent warping. The form of device illustrated in connection with Figs. 1 to 9 is of the water cooled platen type. These platens 15, 15 are mounted for movement toward and from each other, and each comprises a metal body portion 16 with a thin sheet metal face 17. The chamber 18 thus provided is water cooled by means of connections 19, 19 through which a liquid is circulated for controlling the temperature. In some cases the liquid may be heated and in other cases may be cooled, depending on conditions. The chamber 18 is preferably provided with baffles 20 (Fig. 8) for insuring a proper circulation of water over all parts of the rear face of the diaphragm 17 which comes in contact with the glass sheet. The platens are each preferably supported on pivots 21, 21 upon the upper ends of the arms 22, 22. The lower ends of the platens are normally pressed toward each other by means of the springs 23, 23. A cushioning strip 24 lies at the bottom of the V shaped opening between the platens, such strip being made of asbestos or other suitable material which is relatively resilient, and being provided with a handle 25 (Fig. 2) by means of which the strip may be withdrawn after the glass sheet is cooled, such withdrawal also serving to move the glass endways from between the platens. In order to facilitate this endway movement, the strip 24 is supported on the rollers 26. In order to move the arms 22 apart at the same rate of speed, the shafts 27, 27 which carry the arms are provided with the inter-meshing spur gears 28, 28. Also secured to one of the shafts is the operating handle 29.

In operating the apparatus, the frames carrying the glass sheets are moved step by step through the length of the furnace and are brought to approximately a red heat by the time they reach the right hand end of the furnace (Fig. 2). At this point the members 10, 10 on the frames are engaged by the bars 13, 13, and the two frame members are separated, thus permitting the sheet 7 to drop by gravity between the platens 15, 15. The closing of these platens brings the flexible diaphragms 17, 17 into contact with the surfaces of the glass sheet, thus giving the necessary quenching or chilling action. As soon as the glass sheet has been sufficiently cooled the platens are opened, the strip 24 being removed from between the platens carrying on its upper edge the glass sheet. If desired, the speed of movement of the glass sheet may be checked before it strikes the strip 24, this being accomplished by having the platens in partially closed position so that the sides of the glass sheet are frictionally engaged by the faces of the platens as the sheet moves downward therebetween.

Figs. 10, 11, and 12 illustrate a modification in which a solid metal plate 30 is used as the platen. The front face of the platen is scored by the cuts 31, thus dividing the surface into a series of relatively small areas of rectangular cross section. This expedient tends to prevent the plate from warping under the sudden heating action upon the platens. If desired, the solid platens may be cooled by air jets or other suitable means, not shown.

Figs. 13 and 14 illustrate a further modification in the form of platens, wherein such platen 32 is provided on its rear face with ribs 33 for facilitating the radiation of heat therefrom. The front face of this platen is also scored as in the construction of Figs. 10, 11, and 12.

Figs. 15 and 16 illustrate a modification in which a cooling bath 34 is substituted for the cooling platens of the construction heretofore described. Means are provided for control of the temperature of the bath in the form of the circulating pump 35 connected to the bath and to the heat exchangers 36 and 37 by means of the pipes 38, 39, and 40.

The heat exchangers may be of any suitable form; one of them being designed as a cooling device, and the other as a heating device, so that the temperature of the bath may be raised or lowered depending upon the requirements. Preliminary to starting the operation the temperature of the bath will have to be increased, but after the operation is under way the heat imparted to the bath by the hot glass may be such as to call for a cooling of the bath. The liquid used in the bath is preferably a mineral oil from which the volatile products have been distilled so that a temperature of upwards 700° F. may be secured without flashing and ignition. The relation of the furnace construction and the means for carrying the glass to position over the bath are the same as heretofore described, the glass plates being dropped by gravity from the downwardly opening frames 3.

To facilitate the removal of the glass sheets from the bath, a holder is provided in the form of a pair of U shaped frames 41, 41 connected together by the strip 42 which receives the lower edge of the glass when it drops into the holder. The U shaped members are connected at the upper ends by the bail 43. Beneath the frames 41, 41 is a cushioning device in a form of a strip 44 carried by springs 45, 45. After a glass sheet has dropped into the U shaped frames 41, 41, the operator grasps the bail 43 and pulls the device out along the inclined wall 46 of the tank to the position shown in Fig. 16, at which time the sheet may be removed and the device again positioned in the tank so as to receive the next sheet. Because of the high temperature of the bath, the bail will ordinarily be engaged by means of a hook 47, such as shown in Fig. 16. The tank is provided with a suitable drain 48 extending downwardly from the extreme end of the tank. This type of construction is preferred for certain characteristics incident thereto; one of which is the cushion effect provided by the liquid itself, which insures bringing the plates to a gradual stop in the liquid without injury thereto.

What I claim is:

1. In apparatus for case hardening glass sheets, a heating furnace with a track extending therethrough, a sheet glass carrier mounted for movement along the track arranged to support the glass sheet from beneath and opening downwardly to permit the discharge by gravity from the carrier of such sheet, and a receiver located beneath the track and adapted to cool the sheet which drops into it when the carrier is opened.

2. In apparatus for case hardening glass sheets, a heating furnace with a track extending therethrough, a sheet glass carrier mounted for movement along the track arranged to support the glass sheet from beneath and opening downwardly to permit the discharge by gravity from the carrier of such sheet, and a bath of cooling liquid located beneath the track and adapted to cool the sheet which drops into it when the carrier is opened.

3. In apparatus for case hardening glass sheets, a heating furnace with a track extending therethrough, a sheet glass carrier mounted for movement along the track arranged to support the glass sheet from beneath and opening downwardly to permit the discharge by gravity from the carrier of such sheet, a bath of cooling liquid located beneath the track, and a receiving frame in the bath in position to receive the glass sheet when the carrier releases it, said frame being readily removable from the bath.

4. In apparatus for case hardening glass sheets, a heating furnace with a track extending therethrough, a sheet glass carrier mounted for movement along the track arranged to support the glass sheet from beneath and opening downwardly to permit the discharge by gravity from the carrier of such sheet, and a receiver located beneath the track and adapted to cool the sheet which drops into it when the carrier is opened, said receiver comprising a pair of metal platens mounted for movement toward and from each other, and means for moving the platens to engage the sides of the glass sheet.

5. In apparatus for case hardening glass sheets, a heating furnace with a track extending therethrough, a sheet glass carrier mounted for movement along the track arranged to support the glass sheet from beneath and opening downwardly to permit the discharge by gravity from the carrier of such sheet, and a receiver located beneath the track and adapted to cool the sheet which drops into it when the carrier is opened, said receiver comprising a pair of metal platens mounted for movement toward and from each other, means for controlling the temperature of the platens, and means for moving the platens to engage the sides of the glass sheet.

6. In apparatus for case hardening glass sheets, a heating furnace with a track extending therethrough, a sheet glass carrier mounted for movement along the track arranged to support the glass sheet from beneath and opening downwardly to permit the discharge by gravity from the carrier of such sheet, and a receiver located beneath the track and adapted to cool the sheet which drops into it when the carrier is opened, said receiver comprising a pair of flexible metal platens each backed by a body of liquid under pressure and mounted for movement toward and from each other, means for modifying the temperature of said bodies of liquid, and means for moving the platens.

7. In apparatus for case hardening glass sheets, a heating furnace with a track extending therethrough, a sheet glass carrier mounted for movement along the track arranged to support the glass sheet from beneath and opening downwardly to permit the discharge by gravity from the carrier of such sheet, and a receiver beneath the track and adapted to cool the sheet which drops into it when the carrier is opened, said receiver comprising a pair of metal platens mounted for movement toward and from each other, cushioning means adjacent the lower edges of the platens, and means for moving the platens to engage the sides of the glass sheets.

8. In apparatus for case hardening glass sheets, a heating furnace with a track extending therethrough, a sheet glass carrier mounted for movement along the track arranged to support the glass sheet from beneath and opening downwardly to permit the discharge by gravity from the carrier of such sheet, and a receiver located beneath the track and adapted to cool the sheet which drops into it when the carrier is opened, said receiver comprising a pair of metal platens having their faces divided into relatively small areas by cuts and mounted for relative movement, and means for moving the platens so that their opposing faces engage the faces of the glass sheet.

9. In apparatus for case hardening glass sheets, a heating furnace with a track extending therethrough, a sheet glass carrier mounted for movement along the track arranged to support the glass sheet from beneath and opening downwardly to permit the discharge by gravity from the carrier of such sheet, a receiver located beneath the line of travel of the carrier and adapted to cool the sheet which drops into it when the carrier is opened, and means for opening the carrier when it reaches a position above said receiver.

10. In apparatus for case hardening glass sheets, a heating furnace with a track extending therethrough, a sheet glass carrier mounted for movement along the track, including movable means lying beneath and supporting the lower edge of the glass sheet and adapted to be moved laterally to permit the discharge by gravity of the sheet from the carrier, and a receiver located beneath the track and adapted to cool the sheet when it is released from the carrier and drops into it.

11. In apparatus for case hardening glass sheets, a heating furnace with a track extending therethrough, a sheet glass carrier mounted for movement along the track, comprising a pair of frames pivoted together at their upper sides, each having means adapted to engage the glass at its side edges and which release the sheet and permit it to drop when the frames are swung apart, and a receiver located beneath the track and adapted to cool the sheet which drops into it when the carrier is opened.

In testimony whereof, I have hereunto subscribed my name this 12th day of March, 1932.

WILLIAM OWEN.